United States Patent

[11] 3,549,156

| [72] | Inventors | Frank Roy Van Vleet<br>North Reading;<br>David Gilbert Way, Boxborough, Mass. |
|------|-----------|---|
| [21] | Appl. No. | 748,786 |
| [22] | Filed | July 30, 1968 |
| [45] | Patented | Dec. 22, 1970 |
| [73] | Assignee | A. W. Chesterton Company<br>Everett, Mass.<br>a corporation of Massachusetts<br>Continuation of Ser. No. 499,388,<br>Oct. 21, 1965, now abandoned. |

[54] COMPOSITE O-RING
3 Claims, 12 Drawing Figs.

| [52] | U.S. Cl. | 277/228 |
|------|----------|---------|
| [51] | Int. Cl. | F16j 15/00 |
| [50] | Field of Search | 277/227-–233, 235A, 124 |

[56] References Cited
UNITED STATES PATENTS

| 651,425 | 6/1900 | McConnell | 138/151 |
| 2,165,296 | 7/1939 | Oass | 277/228X |
| 2,717,023 | 9/1955 | Hetherington | 277/228X |
| 2,859,061 | 11/1958 | Reid | 277/228 |
| 3,013,830 | 12/1961 | Milligan | 277/124X |

*Primary Examiner*—Laverne D. Geiger
*Assistant Examiner*—Edward J. Earls
*Attorney*—Martin Kirkpatrick ABSTRACT: A composite O-ring having a toroidal core of elastomeric material with a fluidtight covering of a single endless band of chemically resistant, flexible, thermoplastic, heat-sealable, organic plastic sheet film material. The band is in the form of an integral closed circle with overlapping end portions in cross section bonded to one another as by heat-sealing to form a single sealed scarf joint around the entire periphery of one axially facing side of the O-ring, leaving its I.D. and O.D. surfaces entirely free of joints.

PATENTED DEC 22 1970 3,549,156
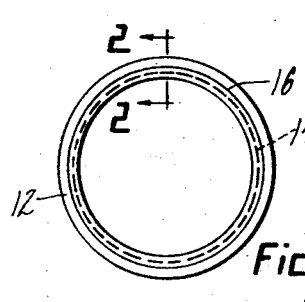
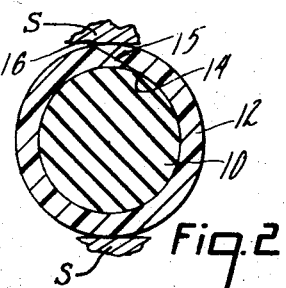
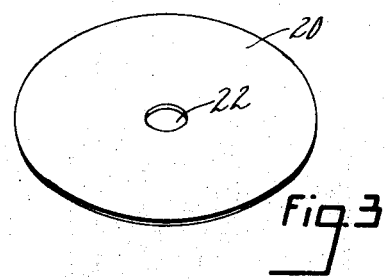
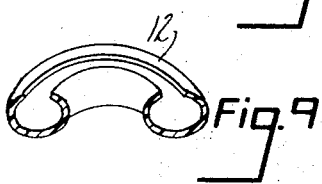
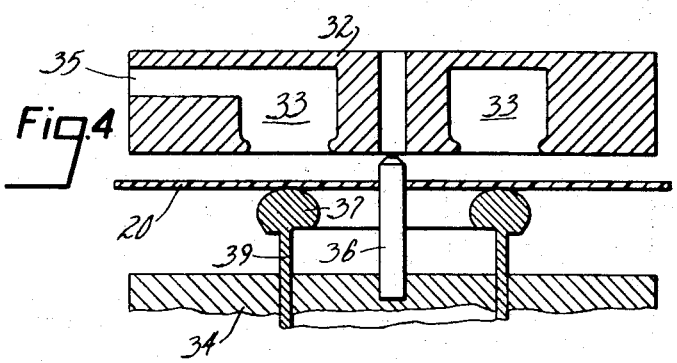
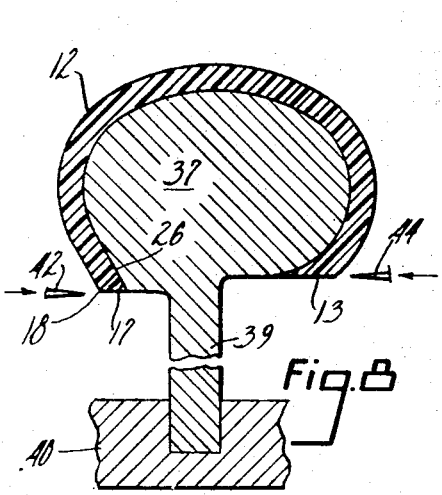
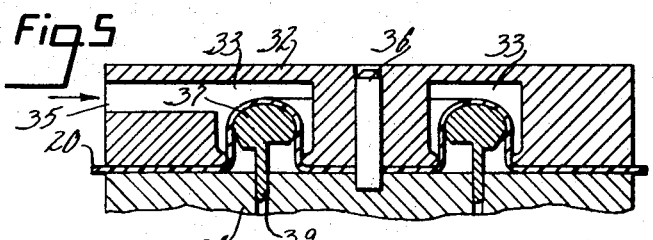
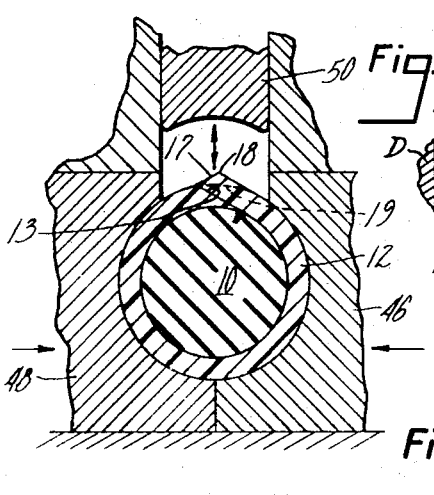
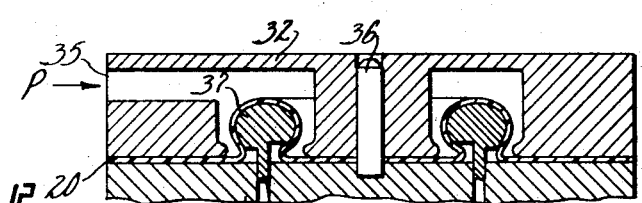
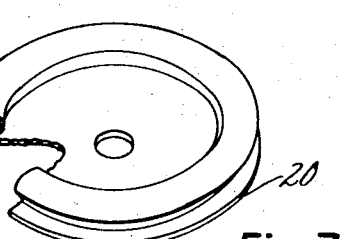

COMPOSITE O-RING

This application is a continuation of our application Ser. No. 499,388, filed Oct. 21, 1965 now abandoned.

Its invention relates to to O-rings as utilized in combination with a pair of opposed surfaces to be sealed and, more particularly, to a novel composite O-ring having an elastomeric core with a fluidtight flexible encapsulating cover of chemically resistant organic plastic sheet film material fitted around the core and heat-sealed to itself by its own substance to form a perfectly fluidtight protective sheath around the elastomeric core.

O-rings are such a well-known article of commerce that the precise standards and specifications to which they must be manufactured are generally not appreciated. For example, O-ring sizes are generally standard within predetermined tolerances and the dimensions of the grooves or the like into which the O-rings are to be inserted are selected in accordance with predetermined compression requirements, etc. This not only results in the unstressed cross section dimension of the O-ring frequently being substantially larger than that of the groove; but also requires that the O-ring have a high degree of cross-sectional resilience for proper fit to provide the requisite degree of sealing over a relatively wide range of conditions. Under these circumstances the flexibility and resilience requirements are such that the choice of material is quite limited to truly elastomeric, rubbery materials.

In commercial practice, however, O-rings are used extensively in contact with fluids for sealing. Typical uses include those wherein the O-ring is used for dynamic sealing and is positioned between opposing cylindrical surfaces, D, which move relatively to one another, such as piston rings, piston rod packings and internal packings in shaft seals on pumps. They are also used for static applications, wherein the O-ring may be clamped between opposing surfaces, S, such as in pipe flanges and as gaskets to seal pump glands to housings. Both of such applications are shown for example, in U.S. Pat. Nos. 3,184,244 and 3,188,095. Unfortunately, O-ring materials having the required degree of resilience without exception cannot be used in sealing a rather wide range of fluids, since they are chemically attacked and destroyed by them.

With this apparent dilemma in mind, a host of experimenters have attempted to produce an O-ring suitably resistant to chemical attack yet meeting all of the other requirements of the O-ring of commerce. Such efforts, which have generally taken the form of an inert coating or covering on a conventional O-ring by a chemically resistant organic plastic material, all appear to have been complete failures principally because of the inability to achieve a perfectly fluidtight seal while meeting the other requirements of the O-ring of commerce, such as the ability to withstand the wear and distortion of both dynamic and static seal applications.

Accordingly, it is the major object of the present invention to prove provide a chemically resistant O-ring which fully meets the requirements of the O-ring of commerce and may be manufactured at reasonable cost.

This object is achieved by providing a novel composite O-ring having an elastomeric core with a flexible fluidtight cover of chemically resistant organic plastic material.

According to the present invention, it is by the use of an endless band of a flexible smooth surfaced film material, of uniform thickness within close tolerances, and bondable to itself preferably solely by its own substance by heat- and pressure-sealing of a single overlapping joint of substantial angular extent for a perfectly fluidtight seal around the entire periphery of one axially facing side of the O-ring, leaving its I.D. and O.D. surfaces entirely free of joints, that composite O-rings of truly circular cross section may be provided. With such a ring, in dynamic applications, the joint is spaced between the cylindrical opposing surfaces to be sealed but out of contact therewith to prevent wear, while in static applications, it is positioned in contact with one of the opposing planar surfaces to limit distortion stress, providing optimum joint positioning for each of the applications.

For the purpose of more fully explaining in detail a preferred embodiment of the invention, reference is now made to the following description together with the accompanying drawings, in which:

FIG. 1 is a plan view of the composite O-ring of the invention;

FIG. 2 is an enlarged sectional view of the O-ring of FIG. 1 taken along the line 2-2 showing its use between static sealing surfaces;

FIG. 3 is an isometric view of the starting configuration of the sheet film material;

FIGS. 4—6 are diagrammatic sectional views of apparatus for forming the starting configuration of FIG. 3;

FIG. 7 is an isometric view of the intermediate product produced from the starting configuration of FIG. 3 by the apparatus of FIGS. 4—6;

FIG. 8 is a sectional view showing a cutting apparatus for trimming the intermediate product of FIG. 7 and the trimmed product itself;

FIG. 9 is a reduced isometric view of a section of the trimmed product of FIG. 8;

FIG. 10 is an isometric view of a section of the trimmed product shown in FIG. 9 with an O-ring inserted therein;

FIG. 11 is a sectional view showing a heat sealing apparatus for heat sealing the overlapping scarfed edges of the trimmed product of FIG. 10 around one axially facing side to provide the composite O-ring of FIGS. 1 and 2; and FIG. 12 is an enlarged sectional view of the O-ring of FIG. 1, showing its use between dynamic sealing surfaces.

Referring first to FIGS. 1 and 2 wherein is shown the completed O-ring according to the present invention, it will be seen to consist of an elastomeric toroidal core 10 of circular cross section with a fluidtight cover 12 of chemically resistant organic plastic sheet film material over its entire surface. Cover 12 is in the form of a continuous band with its peripherally abutting edges heat sealed together in overlapping relationship throughout the substantial extent of their overlapping surfaces providing a single sloping scarf joint generally designated 15 around an axially facing side of the completed O-ring, said joint having its inner seam edge 14 angularly spaced from its outer seam edge 16 to provide a truly circular cross section of a diameter greater than that of core 10 by twice the thickness of the film material of cover 12. Further details of the complete O-ring structure will be explained in more detail in connection with the description of the construction of the O-ring of the invention as set forth more particularly below.

The toroidal core 10 may be of any suitably elastomeric material such as rubber, natural or synthetic, having the desired properties of flexibility, resilience and temperature resistance, as is well understood by those skilled in the art. One preferred material for this purpose is vinylidene fluoride hexafluoropropylene copolymer known as DuPont VITON. In the present invention, however, no consideration need be given to its resistance to chemical attack, so that no compromise need be made in that area. Its dimensions must of course be selected by taking into consideration the thickness of cover 12.

The material of the cover 12, on the other hand, is of great importance, but need not be selected for its resilience, but rather for such considerations as its resistance to chemical attack, its surface finish, its flexibility and its thermoplastic properties for forming and heat-sealing.

Thus, the sheet film material must be flexible. It must have thermoplastic properties for its formation as described below. It should also be readily heat sealable so that it may be sealed with its own substance to provide a perfectly fluidtight overlapping joint 15. It is particularly important that the sheeted film covering be of uniform thickness within narrow limits, e.g. ± 1 mil, in order to meet roundness and other tolerance requirements and present a smooth and glossy low friction surface, without machine tool or casting marks or the like. The surface needed is one such as the surface provided by the extrusion or calendering of a sheeted film at temperatures close to its melting point. Its finished thickness should be a substantial proportion of the cross section of the composite O-ring, preferably about 20 mils, with an O-ring of one-eighth inch cross section diameter, with a tolerance of about 2—3 mils in order to provide an adequate scarf joint width for producing a perfectly fluidtight heat-sealed joint.

A film material found suitable for use in the the invention is a fluorocarbon film made from a completely fluorinated ethylene-propylene copolymer by DuPont and known as DuPont TEFLON FEP fluorocarbon film. Other film materials having the required properties may be used.

In the manufacture of the O-ring of the invention, a suitable sheet material as described above is provided in a starting configuration in the form of a disc 20 (FIG. 3) of substantially greater diameter than that of the finished O-ring, and preferably having a central locating hole 22. Disc 20 is then placed in suitable forming apparatus, such as is shown diagrammatically in FIGS. 4 through 6, including upper and lower dies 32, 34 respectively, forming a pressure chamber 33 therebetween with a fluid opening 35 in upper die 32 and a locating pin 36 in the lower die 34.

An extensible and retractible forming ring having an enlarged free end 37 and a reduced skirt 39 is removably mounted for sliding movement of said skirt in and out of lower die 34 with the free end 37 thus movable within chamber 33. Preferably, for reasons hereinafter explained, the free end 37 of the forming ring has an asymmetrical section as shown in FIG. 8.

With disc 20 positioned in said apparatus, and with the free end 37 of the ring in a disc abutting position, the dies are closed while subjected to a temperature sufficient to thermoform disc 20 until they clamp the outer periphery of said disc between them, stretching a portion of the disc 20 into a U-shape (FIG. 5) and thereafter, the ring is retracted while being subjected to pressure P in chamber 33 applied from a suitable pressure source to the U-shaped disc portion about the free end 37 and skirt 39 (FIG. 6) to provide a disc having a continuous C-shaped band 12 therein as shown in FIG. 7.

The disc incorporating the band 12, after cooling, is transferred on its ring-free end 37 to a cutting support 40 (FIG. 8) and there is cut by means of a pair of knives 42, 44 to sever the band 12 from the remainder of disc 20.

The particular angles at which the band is finally cut by knives 42, 44 whether conducted as a severing or trimming operation, are important in providing a perfectly heat-sealed and fluidtight scarf joint 18. To accomplish this result, the free end 37 of the forming ring is of such cross-sectional configuration to support the band 12 at desired angles with respect to the direction of travel of knives 42, 44. Such angles are different, in that the cut made to produce the end surface 13 to be overlapped by the side surface 26 adjacent the other end slopes to provide an angularly extended surface for sealing, while the cut to be made to produce the other exposed end surface 17 is more nearly perpendicular in order to provide an edge projection 18 for compression during heat-sealing to provide a truly circular outer surface by compression and displacement of the film during heat-sealing.

The heat-sealing operation is accomplished by removing the trimmed cover 12 from the free end 37 of the forming ring, (FIG. 9), inserting a core 10 in it, (FIG. 10), and clamping it with the inserted core between a pair of jaws 46, 48, so that the ends of the cover 12 are held with the side surface 26 adjacent one end surface 17 overlying the sloping other end surface 13, with the projecting edge 18 pointing upwardly around the upper axially facing surface of the of the core 10 (FIG. 11). A heat- and pressure-sealing element 50 having its lower surface in the configuration of the desired outer diameter of cover 12 is moved downwardly to press against projection 18 to displace and compress the film material therebeneath to the position of dotted line 19 of FIG. 11, such being a truly circular configuration conforming to that of the outer diameter of cover 12. This heat- and pressure-sealing provides a single peripheral perfectly fluidtight scarf joint 18 between the ends of the cover 12 around the entire periphery of one axially facing side of the O-ring of the invention.

The O-ring of the invention is especially useful in mechanical seal structures, such as shown and described in U.S. Pat. Nos. 3,184,244 and 3,188,095, for unusual environments such as high chemical reactivity and the like. In such structures, O-rings 22, 33 and 34 are used in dynamic applications, wherein their joints are spaced from and between the opposed relatively moving surfaces D, as appears in FIG. 12, so that wear will not take place at the joint, while O-ring 35 is used in a static application, with the joint being positioned in the region of least distortion, that is, against one of the opposing clamping surfaces S, as appears in FIG. 2.

Various modifications of the invention within the spirit thereof and the scope of the appended claims will be apparent to those skilled in the art.

I claim:
1. A composite O-ring comprising:
    a toroidal core of elastomeric material;
    a fluidtight covering on said toroidal core;
    said covering being in the form of a single unitary peripheral endless band of chemically resistant flexible, thermoplastic heat-sealable organic plastic sheet film material having a smooth, glossy low friction surface free of discontinuities;
    said band being an integral closed circle with a side surface of one end portion in cross section overlapping a surface of the other end portion to a substantial angular extent providing a single overlapping joint, said end portions being heat- and pressure-sealed to one another solely by the substance of said film material, bonding said end portions to one another throughout the extent of said overlapping end portions; and
    said covering providing after heat-sealing a composite O-ring of true circular cross section having a single joint around a single axially facing side of said composite O-ring.
2. A composite O-ring as claimed in claim 1 wherein said overlapping joint is a scarf joint.
3. A composite O-ring as claimed in claim 1 wherein said film material is a fluorinated-ethylene propylene copolymer.